Patented Oct. 27, 1936

2,058,666

UNITED STATES PATENT OFFICE 2,058,666

WATER INSOLUBLE INDULINES AND THEIR MANUFACTURE

Achille Conzetti, Basel, Switzerland, assignor to firm of J. R. Geigy A. G., Basel, Switzerland No Drawing. Application November 4, 1935, Serial No. 48,261. In Germany March 29, 1934

14 Claims. (Cl. 260—29)

The water-insoluble azine dyestuffs of the induline class are obtained by heating aniline and its hydrochloride in presence of a surplus of the base with dehydrogenizing agents. Two methods have been generally developed for this process. The first employs aminoazobenzene, a pure dehydrogenizing agent, and yields the proper blue indulines; the second applies nitrobenzene or nitrophenol as oxidizing agent advantageously in presence of a catalyst, for example metallic iron or copper or salts thereof, and furnishes the grey indulines called nigrosines. These spirit-soluble dyestuffs dissolve in the lower alcohols such as ethanol and methanol only sparingly; the greyer the tint, the lower the solubility.

With these dyestuffs only spirit lacquers of weak concentrations can be made. Where concentrated black spirit solutions are needed it is necessary to use mixtures of several dyestuffs. The azine dyestuffs are completely useless in the modern lacquer industry, wherein the development of the range of nitro-cellulose and acetyl-cellulose lacquers involves the use of various new organic solvents, such as butanol, butyl-acetate, ethylformate, ethyl-lactate and softening agents, such as triphenylphosphate and tricresylphosphate, in which the high molecular azines are practically insoluble.

This invention is based on the observation that the solubility of the water-insoluble induline dyestuffs in lower alcohols, esters, nitrocellulose and acetylcellulose lacquer mixtures, as well as other properties of the acid dyestuffs may be profoundly improved by using in the usual induline melt, viz. in the reaction between aniline and nitrobenzene (as oxidizing agent), instead of aniline a suitable derivatvive or substitution product thereof. The alkoxy-substituted amines of the mono- and di-phenylamine series are best used for the purpose, whereas it is known that phenylenediamines are not suitable, since they lead to water-soluble dyestuffs.

It is advantageous, particularly in the case of amines of the diphenylamine series, to use, not the amine itself but reaction components from which the diphenylamine derivative may be formed during the reaction producing the dyestuff. This can easily be made by using together with the primary amine, for example, a halogen-nitrobenzene or its equivalent, which in consequence of the presence of the strongly negative nuclear substituents especially in ortho- and para-position can readily exchange the reactive atom or group. The numerous known halogen-nitrobenzenes are particularly valuable for this purpose.

According to the activity of the reactive substituent the formation of the diphenylamine derivative may occur before or during the true azine reaction. In connection with the dyestuff formation is the reduction of the nitro-compound, whereby the base of the mono- or diphenylamine-series, which is produced, is either drawn into the reaction or serves as a solvent for the components of the reaction and the final product.

The larger the proportion of nitro-body to the mixture of bases used the more vigorously occurs the formation of the dyestuff, insofar as the course of the reaction is not moderated by the addition of inert solvents. By varying the composition of the mass to be heated, the conditions of heating, the manner of heating up, the duration of the heating, the point of time at which the nitro-body is added and the temperature when the addition occurs, it is possible to influence positively the formation of dyestuff. It is frequently advantageous that a metal, especially a heavy metal or a salt thereof should be present in the mass in order to obtain a technically valuable black tone. Furthermore, it has been found that both the hue and the yield of the dyestuff may be influenced by proper selection and simultaneous use of different metal salts. In general, all heavy metal salts are serviceable, but salts of cobalt, nickel, tin, cadmium, mercury, antimony, strontium, iron, copper, chromium or aluminium with inorganic or organic acids and the salts with complex bound heavy metals are preferable. By convenient variation of the conditions of reaction (for instance applying the reaction under increased pressure) and of the parent materials the properties of the final product may be affected as desired. For example, by such variation dark blue to black dyestuffs are obtained which are soluble without residue in ethanol in the proportion of 1:9 without precipitation on cooling or deposition on standing. Also their degree of solubility in cellulose ester lacquers may be mentioned. Moreover, the new dyestuffs exhibit the hitherto unknown important property that they are fully fast to sublimation and to oils. As compared with the old indulines and nigrosines they have improved fastness to light.

The following examples illustrate the invention:

Example 1

40 kilos of 2-chloro-1-nitrobenzene, 3 kilos of iron-(3)-chloride and 125 kilos of 4-amino-phenol-ethyl-ether are gradually heated together to 190–195° C., while stirring, in an apparatus usual for nigrosine melts. The water produced in the reaction is distilled through a condenser. The formation of dyestuff can be conveniently followed over various intermediate stages. By comparison with a standard sample one can easily ascertain when a predetermined point has been attained, whereupon the reaction is interrupted. After about 18 hours the dyestuff has acquired a greenish blue-black tint; the contents of the vessel are now run into 300 litres of water containing so much hydrochloric acid that the diluted mixture is distinctly acid to Congo and the whole is stirred until cold and thereupon the dark blue dyestuff is filtered. The excess of base is removed from the dyestuff with dilute hydrochloric acid and then with water until free from salt and neutral to Congo. The dry dyestuff dissolves in ethanol, α-hydroxypropionic acid-ethylester or the like, freely and without residue in the ratio of 1:9, as is necessary for the various applications, without the upper limit of solubility being attained; the dyestuff also dissolves completely in the usual concentration in cellulose ester lacquers and spirit lacquers which it colours greenish blue-grey to black according to the quantity of dyestuff employed.

Example 2

40 kilos of 2-chloro-1-nitrobenzene, 200 kilos of 4-amino-phenol-ethylether, 1.5 kilos of copper-(2) acetate and 1.5 kilos of iron-(3)-chloride or -acetate are heated together, at 190–200° C., as described in Example 1, for about 18 hours, that is to say until the desired intensity of colour is obtained. The dyestuff is isolated as described above; it has the same excellent solubility and is distinguished only by having a deeper tint.

Example 3

15.7 kilos of 4-chloro-1-nitrobenzene and 50 kilos of 4-amino-phenol-ethylether are heated together, while stirring, for about 9 hours to gentle boiling. The dyestuff is isolated as described above.

It is a blue powder, freely soluble to a pure blue solution in lower alcohols and esters. In cellulose ester lacquers and spirit lacquers it dissolves without residue to a blue solution.

Example 4

26 kilos of sodium 6-chloro-3-nitrobenzene-1-sulphonate are dissolved in 80 kilos of 4-amino-phenol-ethylether, while heating and stirring, and the solution is heated for some hours to boiling. The mass is worked up in the manner described above.

The dyestuff is a blue powder, having good solubility in the above-named lacquers and solvents. The solutions are reddish-blue to blue-black.

Example 5

30.6 kilos of 4'-ethoxy-2:4-dinitro-diphenyl-amine, 66.2 kilos of 4-amino-phenol-ethylether and 3.7 kilos of hydrochloric acid of 100 per cent strength or 20.5 kilos of 4-chloro-1:3-dinitro-benzene and 80 kilos of 4-amino-phenol-ethylether are heated together to gentle boiling for about 20 hours, and the whole is then run into water, acid with hydrochloric acid. The dyestuff is worked up as usual. It is a dark blue powder and colours cellulose ester lacquers and other lacquer mixtures brownish-black tints, and is freely soluble in the ratio of 1:9 in lower alcohols and esters, for example α-hydroxy-propionic acid-ethylester.

Example 6

19.2 kilos of 2:4-dichloro-1-nitrobenzene and 70 kilos of 2-aminophenol-methylether are heated together to gentle boiling for 9 hours; the mass is then allowed to run, while stirring, into a mixture of 300 litres of water and 70 kilos of hydrochloric acid and the dyestuff which separates is worked up as usual. It dyes the above named lacquer mixtures greenish-black tints and is freely dissolved by alcohols and α-hydroxy-propionic acid-ethylester up to 10 per cent.

Example 7

A mixture of 225 kilos of 4-amino-phenol-ethyl-ether, 56 kilos of nitrobenzene, 56 kilos of hydrochloric acid of 30 per cent strength and 2.7 kilos each of iron-(3)-acetate and copper-(2)-acetate or 5.4 kilos of iron-(2)-chloride alone, is gradually heated to 195–200° C. and kept at this temperature for about 16 hours. The solubility of the dyestuff thus obtained is not so excellent as that of the dyestuffs described in Examples 1–3; it has also a poorer colour by artificial light, but its solubility is better than that of the ordinary nigrosine brands.

Example 8

40 kilos of 2-nitro-anisole are mixed with 150 kilos of 4-amino-phenol-ethylether and 10 kilos of copper-(2)-acetate, and the mixture is heated for about 18 hours until the quantity of the dyestuff no longer increases. The mass is then poured into 300 litres of water containing 150 kilos of concentrated hydrochloric acid; the precipitated dyestuff is filtered and washed neutral to Congo.

There is obtained a dyestuff which, in contrast with that of Example 1, does not give blue-black but coal-black tints. Its solubility in alcohol, ethyl acetate, lacquer solvents and the like is as good as that of the dyestuff of Example 1.

Example 9

41.5 kilos of 2-nitraniline, 52 kilos of 4-amino-phenol-ethylether hydrochloride, 110 kilos of 4-amino-phenol-ethylether are mixed with 1.5 kilos of copper-(2)-acetate and 1.5 kilos of iron-(3)-acetate and the mixture is heated for about 18 hours at 180–185° C. The dyestuff is isolated in the manner described in Example 1. The new dyestuff dyes cellulose ester lacquers blue-black; its solubility, fastness to light and other properties correspond with those of the dyestuff described in Example 1.

Example 10

55.2 kilos of 2:4-dinitraniline, 52 kilos of 4-amino-phenol-ethylether hydrochloride and 110 kilos of 4-amino-phenol-ethylether are mixed together with 1.5 kilos of copper-(2)-acetate and 1.5 kilos of iron-(3)-chloride; the mixture is heated at 180–185° C. for about 15 hours. The mass is worked up in the manner described in Example 1.

The dyestuff is obtained in very good yield and dyes cellulose ester lacquers coal-black; it has the excellent properties of the dyestuffs described in Examples 1–10, but exceeds all of them in its colour strength.

Example 11

60.75 kilos of 1:3-dinitro-4-chloro-benzene, 300 kilos of 4-amino-phenol-ethylether and 1.5 kilos of metallic copper powder are heated together for 7 to 8 hours up to 195–200° C. The melt is worked up in the usual manner.

The dyestuff is obtained in very good yield and dyes cellulose ester lacquers blue-black. It has the excellent properties of the dyestuffs described in the Examples 1–10.

If instead of the above-named nitro-bodies others are used, for instance 3:5-dichloro-1-nitrobenzene, 2-chloro-3:5-dinitrobenzoic acid, phenyl-(5-chloro-2-nitrophenyl)-ether, 2:6-dinitraniline, 2-nitrophenetole, 2:4-dinitro-anisole and 2:4-dinitrophenetole, 2-methoxy-3:5-dinitrobenzoic acid or the like, similar dyestuffs are obtained, which yield blue to black tints correspondingly with the addition of metal, manner and duration of heating as desired.

Instead of the aforesaid alkyl-hydroxy-substituted amines, their isomerics and homologues may be used; the solubility of these dyestuffs obtained in the lacquers and solvents in question is, however, somewhat less.

What I claim is:

1. A process for the manufacture of water-insoluble azine dyestuffs of the induline class comprising effecting the induline reaction between an alkoxy-substituted amine of the benzene series and a nitrobenzene as an oxidizing agent.

2. A process for the manufacture of water-insoluble azine dyestuffs of the induline class comprising effecting the induline reaction between 4-aminophenol-ethyl-ether and a nitrobenzene as an oxidizing agent.

3. A process for the manufacture of water-insoluble azine dyestuffs of the induline class comprising effecting the induline reaction between an alkoxy-substituted amine of the benzene series and an oxidizing agent consisting of a nitrobenzene which contains a mobile nuclear substituent.

4. A process for the manufacture of water-insoluble azine dyestuffs of the induline class comprising effecting the induline reaction between an alkoxy-substituted amine of the benzene series and an oxidizing agent consisting of a nitrobenzene which contains a chlorine atom as a mobile nuclear substituent.

5. A process for the manufacture of water-insoluble azine dyestuffs of the induline class comprising effecting the induline reaction between an alkoxy-substituted amine of the benzene series and an oxidizing agent consisting of a nitro compound of the diphenylamine series obtained by the reaction between a nitro compound containing a mobile nuclear substituent and an amine of the benzene series.

6. A process for the manufacture of water-insoluble azine dyestuffs of the induline class comprising effecting the induline reaction between 4-aminophenol-ethyl-ether and a nitrobenzene which contains a mobile nuclear substituent.

7. A process for the manufacture of water-insoluble azine dyestuffs of the induline class comprising effecting the induline reaction between 4-aminophenol-ethyl-ether and a nitrobenzene which contains a chlorine atom as a mobile nuclear substituent.

8. A process for the manufacture of water-insoluble azine dyestuffs of the induline class comprising effecting the induline reaction between an alkoxy-substituted amine of the benzene series and an oxidizing agent consisting of a nitrobenzene which contains a mobile nuclear substituent, in the presence of a heavy metal as a catalyst.

9. A process for the manufacture of water-insoluble azine dyestuffs of the induline class comprising effecting the induline reaction between an alkoxy-substituted amine of the benzene series and an oxidizing agent consisting of a nitrobenzene which contains a mobile nuclear substituent, in the presence of a heavy metal salt as a catalyst.

10. A process for the manufacture of water-insoluble azine dyestuffs of the induline class comprising effecting the induline reaction between an alkoxy-substituted amine of the benzene series and an oxidizing agent consisting of a nitrobenzene which contains a mobile nuclear substituent, in the presence of copper.

11. A process for the manufacture of water-insoluble azine dyestuffs of the induline class comprising heating 4-aminophenol-ethyl-ether with 2-chloro-1-nitrobenzene in the presence of cupric and ferric acetates.

12. A process for the manufacture of water-insoluble azine dyestuffs of the induline class comprising heating 4-aminophenol-ethyl-ether with 2:4-dinitraniline in the presence of cupric and ferric acetates and hydrochloric acid.

13. A process for the manufacture of water-insoluble azine dyestuffs of the induline class comprising heating 4-aminophenol-ethyl-ether with 1:3-dinitro-4-chloro-benzene in the presence of metallic copper powder.

14. Water-insoluble azine dyestuffs of the induline class obtained by heating a nitro-benzene with an alkoxy-substituted amine of the benzene series, having improved solubility in lower alcohols, esters, nitrocellulose and acetyl-cellulose lacquer mixtures, and being fast to light, to sublimation and to oils.

ACHILLE CONZETTI.